United States Patent [19]
Klopping

[11] 3,930,010
[45] *Dec. 30, 1975

[54] FUNGICIDAL FORMULATIONS OF 2-BENZIMIDAZOLECARBAMIC ACID, ALKYL ESTERS

[75] Inventor: Hein Louis Klopping, Wilmington, Del.

[73] Assignee: E. I. Du Pont de Nemours & Co., Wilmington, Del.

[ * ] Notice: The portion of the term of this patent subsequent to Apr. 18, 1989, has been disclaimed.

[22] Filed: Jan. 18, 1974

[21] Appl. No.: 434,556

Related U.S. Application Data

[63] Continuation-in-part of Ser. No. 260,196, June 6, 1972, abandoned, which is a continuation-in-part of Ser. No. 861,791, Sept. 29, 1969, abandoned, which is a continuation-in-part of Ser. No. 727,036, May 6, 1968, abandoned, which is a continuation-in-part of Ser. No. 629,914, April 11, 1967, abandoned.

[52] U.S. Cl............................. 424/273; 424/DIG. 8
[51] Int. Cl.²............................................ A01N 9/22
[58] Field of Search.................. 424/273; 260/309.2

[56] References Cited
UNITED STATES PATENTS

| | | | |
|---|---|---|---|
| 3,010,968 | 11/1961 | Loux | 260/309.2 |
| 3,454,700 | 7/1969 | Hyson | 424/273 |
| 3,657,443 | 4/1972 | Klopping | 424/273 |

*Primary Examiner*—V. D. Turner

[57] ABSTRACT

Compounds of the formula:

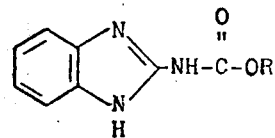

where R is methyl or ethyl, are useful as fungicides to control fungus diseases of living plants. When these compounds are formulated or combined with a surfactant at or above its critical micelle concentration in the spray slurry, improved fungicidal activity is obtained with continuing safety to the treated plants.

9 Claims, 2 Drawing Figures

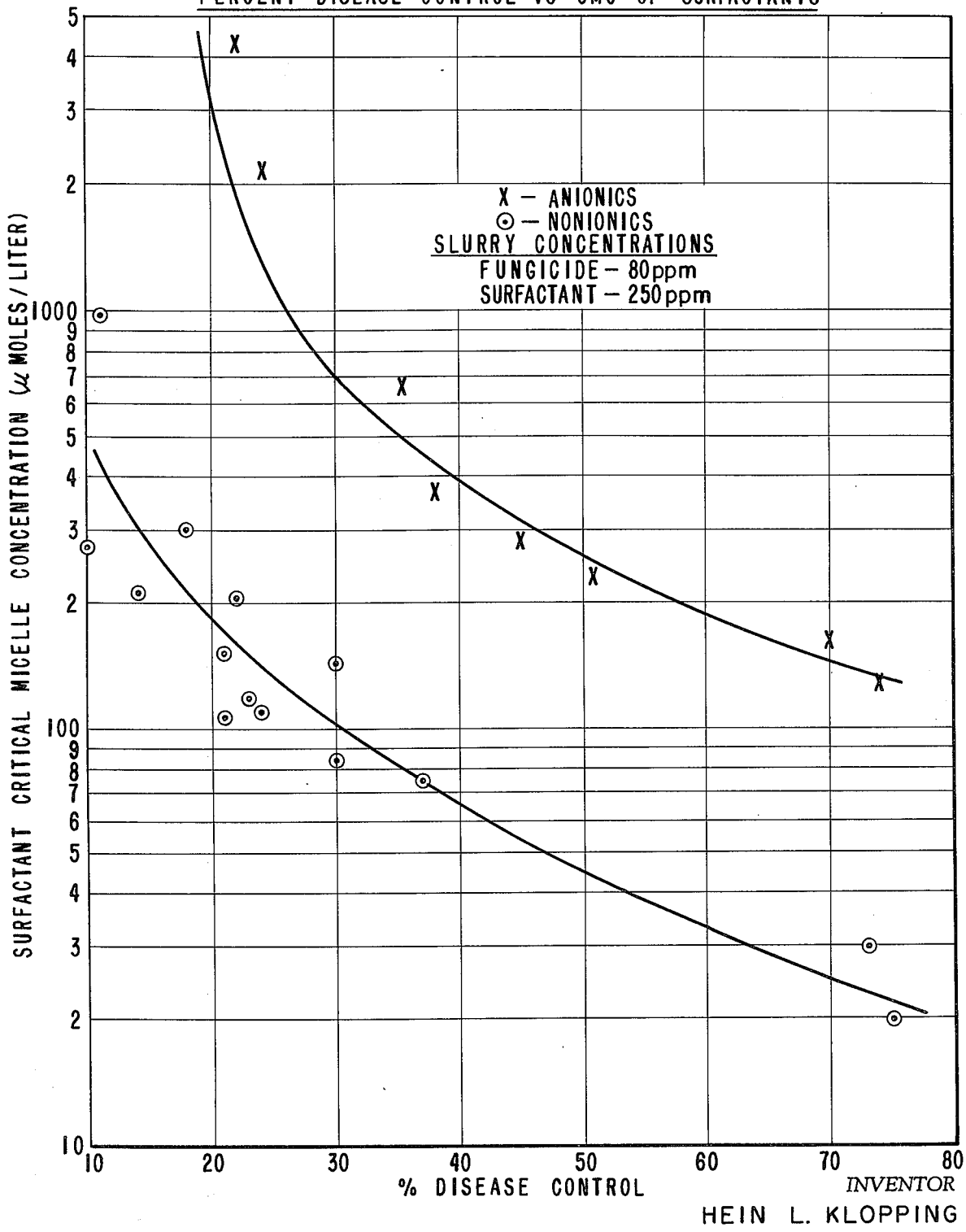

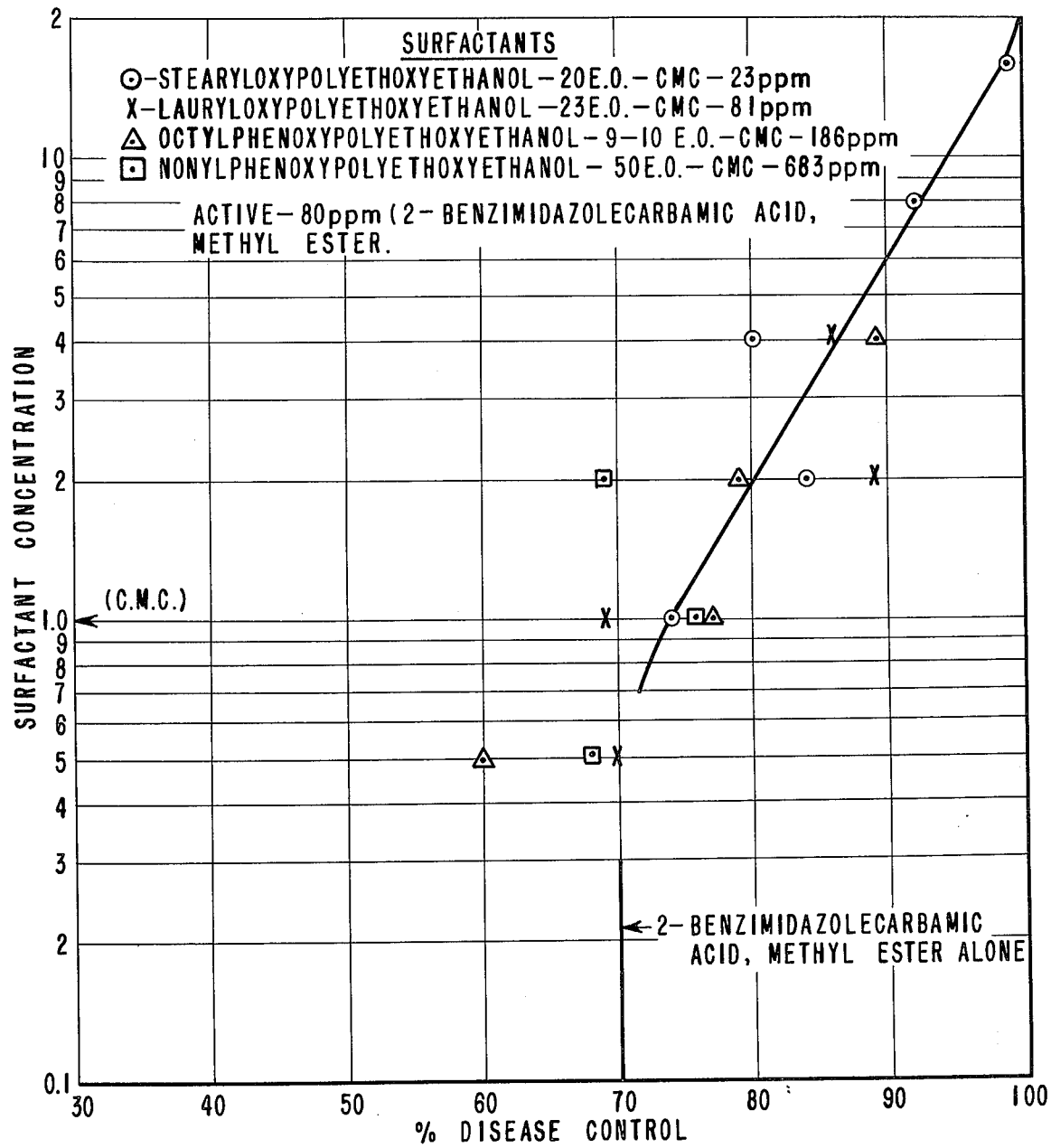

FUNGICIDAL FORMULATIONS OF 2-BENZIMIDAZOLECARBAMIC ACID, ALKYL ESTERS

CROSS REFERENCE TO RELATED APPLICATIONS

This application is a continuation-in-part of my copending application Ser. No. 260,196 filed June 6, 1972 now abandoned, which is a continuation-in-part of my copending application Ser. No. 861,791, filed Sept. 29, 1969, now abandoned, which is a continuation-in-part of my copending application Ser. No. 727,036, filed May 6, 1968, now abandoned, which application is a continuation-in-part of my copending application Ser. No. 629,914, filed Apr. 11, 1967, now abandoned.

BRIEF SUMMARY OF THE INVENTION

This invention relates to fungicidal compositions and methods of employing these compositions in the exceptionally beneficial control of fungus diseases of living plants or plant parts. These methods and compositions provide a curative effect while at the same time providing a protective effect with a broad margin of safety to the plants.

I have discovered that the aforementioned beneficial effect is provided by compositions comprising or containing and methods employing a compound of the formula:

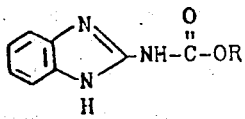

where R is methyl or ethyl, in combination with a surfactant at or above its critical micelle concentration in the final spray slurry. Benefits are also obtained when the above compound is in the composition in the form of particles below 5 microns in diameter.

It will be understood that the above structure can exist in two tautomeric forms:

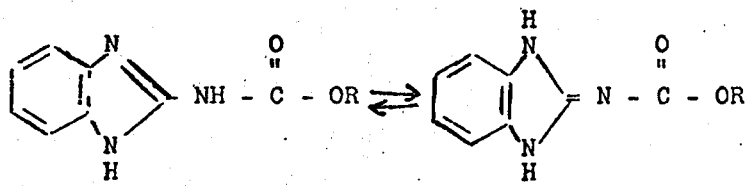

The salient attributes of this invention are that the compositions and methods taught (1) eminently meet the numerous demanding requirements (including lack of phytotoxicity) of practical fungus disease control of desirable plants and (2) provide the highly unique result of curing plants that are already infected with virulent fungi. These attributes are obtained by applying the active ingredient with such adjuvants as facilitate its penetration into plants.

In order to be of utility in the control of fungus diseases of living plants, it is necessary that compositions and accompanying methods provide, first and foremost, for an adequate margin of safety to the treated plants. A great many of the compounds which show fungicidal effects when tested in artificial media or on other inanimate substrata cannot be used to control fungus diseases of living plants due to an undesirable effect on the host plants. The compositions and methods of this invention are remarkable in the broad range that exists between the minimum use levels required for the desired desease control performance and amounts that can be applied without plant injury (phytotoxicity). In many instances, levels 60 or more times the required minimum use rate are safe on the host plants.

Phytotoxicity may take any of a number of forms among which are: leaf burn, reduced or abnormal top growth, abnormal root growth, reduced fruit set, poor fruit finish, decreased yield, and undesirable harvest quality (reduced sugar or protein, disagreeable taste, etc.). The compositions and methods of this invention are free of any implication in adverse effects of these or other types when proper attention is given to the selection of adjuvants.

It has been demonstrated that in many instances heavy metal ions play a part in certain types of phytotoxicity. It has been reported, for example, that trace amounts of copper can damage apple finish. Such heavy metals can also accumulate to undesirable levels in soils. The compositions and methods of this invention make it possible to avoid completely the use of phytotoxic heavy metal ions in treatments for fungus disease control.

Additional requirements for practical fungus disease control on plants include use of available or easily obtainable application equipment, convenience and safety in handling, lack of hazard to the consumer of treated agricultural produce, and others well known to those skilled in the art. The compositions and methods of this invention also satisfy these requisites admirably.

An exceptionally valuable characteristic of the compositions and methods of this invention is their effectiveness in curing fungus infections already present in living plants. Plant diseases are now most commonly controlled by protective sprays applied on a predetermined schedule. Although this requires that the expenditure be made before it is known whether or not disease would actually appear, no other course of action is open to the grower due to the lack of reliable and broadly active curative treatments.

Employing the curative compositions and methods of this invention, no chemical need be applied until after weather conditions or other circumstances have been such as to actually permit the initiation of fungus attack (infection). The teachings of this invention make it possible to eliminate the fungus (or fungi) from within the plant (i.e. to cure the disease). The great savings to the grower in chemical cost and application labor as a result of the curative effect of the compositions and methods of this invention are clearly apparent. When conditions favoring disease fail to appear during the life of a crop, as is sometimes the case, the cost of chemical treatment is entirely eliminated through the knowledge that curative treatments are available if needed.

The active components of this invention can enter and move about within living plants. Such entry and systemic movement is a factor in the curative effect described above. In addition, however, this entry and systemic movement result in effective and extended protection of the treated plants from subsequent new fungus attack. A fungus germinating on the plant surface, penetrating the epidermis and growing into or around the host plant cells comes into contact with the fungicide inside the host and is killed. Thus, treatments made to cure an existing fungus infection also serve the dual purpose of providing protection for the future.

Where this approach is desired for any reason, the compositions and methods of this invention can be employed to provide a conventional preventive control of fungus diseases.

Curative and preventive disease control on desirable living plants are obtained to the greatest extent when the compounds of the formula are finely divided (as described hereinafter) and used in conjunction with a surfactant at or above its critical micelle concentration in the spray slurry.

The matter of particle size deserves special attention. Although the initial effect obtained with a particular chemical is often improved as particle size is reduced, the residual effect frequently decreases. The latter phenomenon is associated with characteristics permitting or enhancing excessive chemical loss from small particles. The compounds of the formula are improved in all aspects of performance, especially curative disease control and consistency in activity, as the particle size is decreased to the degree specified. The small particle size material, when formulated and used as described, results in the maximum penetration required for most effective curative disease control yet provides full residual disease protection.

DESCRIPTION OF THE FIGURES

FIGS. 1 and 2 are two charts which illustrate the effect of surfactant concentration on the disease control of the compounds of the invention. These charts are explained in detail in the Description of the Preferred Embodiments.

DESCRIPTION OF THE PREFERRED EMBODIMENTS

The 2-benzimidazolecarbamic acid esters of the formula can be prepared by any of several methods. For example, the esters can be prepared by a three reaction sequence in which, in the first reaction, thiourea is mixed with dimethyl sulfate to produce 2-methylthiopseudoureasulfate in solution. The second reaction consists of the addition to the reaction mixture of an alkyl chloroformate followed by a base to produce an acylated 2-methylthiopseudourea. The last step consists of the addition of a protonic acid and an o-phenylenediamine to produce the benzimidazoles of the formula.

As previously mentioned, the compounds of the formula provide curative and preventive control of a wide variety of fungus disease of desirable plants without damaging the host.

The many fungi against which the compounds of this invention are active may be represented by, without being limited to, the following: *Venturia inaequalis*, which causes apple scab; *Podosphaera leucotricha*, which causes powdery mildew on apple, *Uromyces phaseoli*, which causes bean rust; *Cercospora apii*, which causes early blight of celery: *Cercospora arachidicola* and *C. personate*, which cause leaf spot of peanuts; *Cercospora beticola*, which causes leaf spot of sugar beets; *Cercospora musae*, which causes Sigatoka disease of banana; *Septoria apii-graveolentis* which causes late blight of celery; *Monolinia (Sclerotinia) laxa* or *M. fructicola* which cause brown rot of stone fruits; *Guignardia bidwellii* which causes grape rot; *Botrytis cinerea*, which causes gray mold on fruits and vegetables; *Erysiphe cichoracearum*, which causes powdery mildew on cantaloupe and other cucurbit crops; *Penicillium digitatum*, which causes green mold on citrus; *Penicillium expansum*, which causes blue mold on apples; *Sphaerotheca humuli*, which causes powdery mildew on roses; *Diplocarpon rosae*, which causes black spot on roses; *Pithomyces chartorum* which is found in pastures and other turf areas; *Uncinula necator*, which causes powdery mildew on grapes; *Coccomyces hiemalis*, which causes cherry leaf spot; *Cladosporium carpophilum*, which causes peach scab; *Erysiphe graminis hordei*, which causes powdery mildew on barley; *Piricularia oryzae*, which causes rice blast; *Mycosphaerella citrullina* which causes gummy stem blight of cucurbits; *Colletotrichum spp.*, which cause anthracnose disease on a number of crops and *Sclerotinia sclerotiorum*, which causes mold or rot of beans and other crops.

The compositions and methods of this invention provide curative and protective effects against fungus diseases of living plants when applied to the proper locus by the methods described hereinafter and at a sufficient rate to exert the desired effect. They are especially suited for disease control on living plants such as fruit-bearing trees, nut-bearing trees, ornamental trees, forest trees, vegetable crops, horticultural crops (including ornamentals, grapes, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be cured of fungus diseases or protected from fungus attack by applying one or more of the active compounds to the plant by foliar treatment. Applications to plants to accomplish the initial curative effect as well as to provide subsequent protection from fungus diseases are made to the aerial parts (i.e. stems, foliage or fruit) by spraying, dusting or misting as described in more detail below.

Preferred rates for application of the compounds of this invention to foliage, stems and fruit of living plants range from 0.02 to 20 kilograms of the finely divided form of the active ingredient per hectare. The optimum amount within this range depends upon a number of variables which are well-known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days.

Application to the foliage, stems and fruit of plants at the rate indicated above is generally accomplished by employing sprays, dusts or aerosols containing the proper amount of active ingredient. For the control of fungus diseases which are regularly present, applications may start prior to the time that the problem actually appears and continue on a pre-determined schedule. Such a procedure is termed "preventive" or "protective" disease control.

With the compositions and methods of this invention, successful control is also accomplished by applications made after the plants are already diseased. Fungus mycelia within the plant tissue are actually killed. This approach or effect is termed "curative" or "eradicant"

and permits the user to realize the considerable savings discussed above.

Curative as well as preventive control of plant diseases with the compositions and methods of this invention is enhanced if the treated plant parts are moist for one or more periods of 2 to 12 hours each soon after the composition containing the active compound is applied. Often the slow-drying of an original spray treatment or naturally occurring rains, mists, fogs or dews will accomplish this. Under other circumstances, such as during dry periods or in shelters such as greenhouses, it may be necessary to keep the plants moist by some special effort to assure best results.

Fungus disease control on living plants with the compounds of the formula is improved when these compounds are formulated with adjuvants as described in my U.S. Pat. No. 3,657,443 entitled "2-Benzimidazolecarbamic, Acid, Alkyl Esters as Foliar Fungicides". However, it has been discovered that disease control is markedly improved by using surfactants at or above their critical micelle concentration in the spray slurry, for example, in the water in which the benzimidazole fungicide is applied. The surfactants can be an integral part of the formulation or can be added separately from the active compounds. Their presence at or above the C.M.C. markedly improves the disease control performance of the compounds of this invention on foliage, stems and fruit.

With the use of these surfactants the particle size of the active ingredient is not as critical, although the best results still are obtained when the finely divided active ingredient is used.

Surfactants acting as penetrants for the fungicides of this invention can be defined as compounds which migrate to interfaces and reduce the surface energy at these interfaces. For example, these surfactants reduce the surface tension of water. Surfactants can exist in two different physical forms in solvent systems depending upon the concentration at which they are present. These are (1) an essentially monomolecular form, and (2) an aggregate (or colloidal particle) of surfactant molecules called a micelle. Such micelles can vary in aggregation from two or three units up to many hundreds or even thousands. In these micelles the surfactant molecules are usually arranged in orderly patterns i.e. forming spherical, ovoid, or plate-like structures. Also, micelles are usually in equilibrium with surfactant molecules in the bulk phase. The surfactant concentration at which these micelles begin to form in a given solvent is called the critical micelle concentration, or the CMC, for that particular solvent. Below the CMC concentration, surfactants are present in the essentially monomolecular form in solution. At the CMC, micelles begin to form, and as the total concentration of surfactant is increased further, the number or size of micelles increase while the amount of surfactant molecules in the monomolecular form remains largely constant.

The surprising discovery was made that when the compounds of this invention are combined with surfactants, (which may be anionic, cationic, non-ionic or amphoteric) the efficiency of the combination is related to the CMC of that surfactant in water. For example, when a series of surfactants is added each at the same weight concentration of 250 ppm to spray slurries (80 ppm active) of 2-benzimidazolecarbamic acid, methyl ester, the fungicidal activity of each combination toward cucumber powdery mildew is inversely related to the CMC of the surfactant added. The relationship is shown in FIG. I for non-ionic and anionic surfactants. The surfactant CMC, on a micromoles per liter basis, is plotted on a log scale against the percent disease control actually obtained in the greenhouse on cucumber powdery mildew. In this Figure each of the points plotted represents a separate surfactant having a known CMC.

This concept was tested further with apple scab disease where 2-benzimidazolecarbamic acid, methyl ester at a fixed concentration of 80 ppm was applied with four surfactants of widely varying CMC's. These surfactants were used at several concentrations which were fractions or multiples of the CMC concentration for each surfactant. The results plotted in FIG. II support and extend the conclusion reached from the data presented in FIG. I; that is, a surfactant, in order to function as an effective penetrant and provide the unexpected increase in activity, should be present in the spray slurry above its CMC concentration and preferably at two or more times its CMC concentration.

Thus, the chemical nature of the surfactant molecule is of lesser importance than the requirement for the presence of micelles. This is a new and very surprising concept in respect to the biological activity of fungicide-surfactant combinations and is of great practical significance as it allows logical selection of highly effective penetrants for use with the compounds of this invention on a basis not heretofore possible. This concept also teaches that these surfactants must be used at concentrations above the CMC level and preferably 2 × or more above this level for best results.

Measurement of the CMC of a surfactant can be carried out by several methods, most important of which are (1) surface tension, (2) light scattering, (3) iodine solubilization and (4) conductance. The surface tension method is preferred due to its simplicity and general applicability; however, in certain instances, one or more of the other methods may be useful.

The procedures required for determining the CMC by the above methods are well known in the art and are described in the following references.

1. Surface Tension Method
    Hsiao and Dunning, J. Phys. Chem. 59, 362 (1955)
    Hsiao, Dunning and Lorenz, J. Phys. Chem, 60, (1956)
    Crook, Fordyce and Trebbi, J. Phys. Chem. 67, 1987 (1963)
2. Light Scattering Method
    Debye, J. Phys. Chem, 53, 1 (1949)
    Schick, Atlas and Eirich, J. Phys. Chem. 66, 1326 (1962)
    Becher, J. Colloid. Sci. 16, 49 (1961)
3. Iodine Solubilization Method
    Ross and Olivier, J. Phys. Chem. 63, 1671 (1959)
4. Conductance
    McBain, Dye and Johnston, J. Am. Chem. Soc. 61, 13210 (1939)
    Ralston and Hoerr, J. Am. Chem. Soc. 64, 772 (1942)

The CMC values obtained by the various methods are usually in reasonably good agreement; however, as those skilled in the art know, surfactants are usually polydisperse or even heterodisperse materials. In other words, they are not pure compounds but mixtures of closely related structures and sometimes even deliberate mixtures of widely different structures blended to give special effects. With such materials the critical micelle concentration can be different to determine, since there often is a concentration range over which micelles begin to form. Because of this, different methods of determining critical micelle concentration (light scattering, surface tension, iodine solubilization, etc.) can signal micelle formation at slightly different concentrations.

A list of CMC's for a wide variety of surfactants is given in Table I. These CMCs were obtained in water at room temperature via the indicated method or methods. It should benoted that the CMC's of surfactants are constants only under specified conditions of temperature, sample purity, and the presence or absence of other adjuvants in the spray slurry. In spite of these qualifications, published data on CMC's including those in Table I are normally in good agreement with the CMC values actually observed in a practical spray slurry of the compounds of this invention since the presence of spray concentrations of the active fungicides do not change the surfactant CMC's appreciably. Where other adjuvants are present; particularly electrolytes, e.g. inorganic salts, the CMC's of ionic surfactants (and some non-ionic ones as well) can be drastically changed (see Table II).

Additional CMC values and a general discussion of the role of CMC colloid science can be found in "Critical Micelle Concentrations of Aqueous Surfactant Systems" by Mukerjee and Mysels, National Bureau of Standards NSRD-NBS 36, February 1971 CMC's

Table I

CMC of Typical Surfactants* in Water at Room Temperature

| Surfactant | CMC in ppm. | Method*** |
|---|---|---|
| Potassium oleate | 330 | 1 |
| Sodium dodecylbenzenesulfonate | 1500 | 1 |
| Sodium lauryl sulfate ("Duponol" ME) | 650 | 1 |
| Sodium lauryl ether sulfate-4 E.O.** | 44 | 1 |
| N-Laurylbetaine | 18 | 1 |
| Cetyldimethylbenzylammonium chloride | 120 | 1 |
| Sodium lauryl sarcosinate | 650 | 1 |
| Stearyltrimethylammonium chloride | 125 | 1 |
| Lauryltrimethylammonium chloride | 800 | 1 |
| Polyoxyethylene(20)sorbitan monooleate | 13 | 2,3 |
| Polyoxyethylene(20)sorbitan monostearate | 27 | 2,3 |
| Polyoxyethylene(20)sorbitan monopalmitate | 29 | 2,3 |
| Polyoxyethylene(20)sorbitan monolaurate | 60 | 2,3 |
| Lauryloxypolyethoxyethanol-7 E.O.* | 25 | 1 |
| lauryloxypolyethoxyethanol-8 E.O. | 59 | 2.3 |
| Lauryloxypolyethoxyethanol-23 E.O. | 72,90 | 1 and 2,3 |
| Tridecyloxypolyethoxyethanol-15 E.O. | 129 | 2,3 |
| Stearyloxypolyethoxyethanaol-10 E.O. | 21 | 2 |
| Stearyloxypolyethoxyethanol-20 E.O. | 23 | 2 |
| Octylphenoxypolyethoxyethanol-5 E.O. | 50 | 1 |
| Octylphenoxypolyethoxyethanol-7 E.O. | 94 | 1 |
| Octylphenoxypolyethoxyethanol-9 E.O. | 174 | 1 |
| Octylphenoxypolyethoxyethanol-10 E.O. | 207 | 1 |
| Nonylphenoxypolyethoxyethanol-10 E.O | 50,64 | 1 and 2,3 |
| Nonylphenoxypolyethoxyethanol-15 E.O. | 77,97,106 | 2,3 and 1 and |
| Nonylphenoxypolyethoxyethanol-20 E.O. | 154,170 | 1 and 1 |
| Nonylphenoxypolyethoxyethanol-30 E.O. | 235,284,423 | 2,3 and 1 and |
| Nonylphenoxypolyethoxyethanol-50 E.O. | 683 | 1 |
| Nonylphenoxypolyethoxyethanol-100 E.O. | 4620 | 1 |
| Polyoxyethylene(30)stearate | 81 | 2 |
| Polyoxyethylene(50)stearate | 140 | 2 |
| Polyoxyethylene(100)stearate | 160 | 2 |
| Polyethylene glycol 200 monolaurate | 31 | 1 |
| Polyethylene glycol 400 monolaurate | 60 | 1 |
| Polyethylene glycol 600 monolaurate | 70 | 1 |
| Polyethylene glycol 600 monostearate | 125 | 1 |
| Sorbitan monolaurate | 125 | 1 |
| Polyhydric alcohol ester ("Trem" 014) | 40 | 1 |
| Trimethylnonylpolyethylene glycol ether ("Tergitol" TMN) | 770 | 1 |
| Sodium N-methyl-N-oleyltaurate | 48 | 1 |
| Coconut Acid ester of sodium isethionate | 475 | 1 |
| Modified phthalic glycerol alkyd resin ("Triton" B 1956) | 32 | 1 |
| Dodecylphenoxypolyethoxyethanol("Tergitol" 12-P-9) | 15 | 1 |
| Complex organic phosphate ester acid ("Gafac" RS-610) | 15 | 1 |
| Dimethyldistearylammonium chloride | 170 | 1 |
| Dimethyldi(hydrogenated)tallowammonium chloride | 170 | 1 |
| Ethylene oxide-primary fatty amine condensates ("Ethomeen" C/15 neutralized) | 120 | 1 |
| Fatty alkylol amide condensate ("Alrosol" O neutralized) | 70 | |

Table I-continued

CMC of Typical Surfactants* in Water at Room Temperature

| Surfactant | CMC in ppm. | Method*** |
|---|---|---|
| Modified alkanolamide("Witcamide" 272) | 220 | 1 |
| Sodium N-coco-$\beta$-aminopropionate | 44 | 1 |
| Substituted imadazoline ("Onamine" RO neutralized) | 135 | 1 |

*The surfactants listed in Table 1 are in most cases commercial, polydisperse compounds and the name given indicates the predominant moiety present or an average composition. For example, lauryloxypolyethoxyethanol E.O.** is produced by the condensation of lauryl alcohol, which may also contain small amounts of lower and higher alcohols, with ethylene oxide to produce a composition containing an average of 23 moles of ethylene oxide per molecule; however, molecular species are also present containing smaller and greater quantities of ethylene oxide.
**ethylene oxide
***referring to the four methods for determining CMC previously set forth
*ethylene oxide The data in Table II show that the CMC of sodium dodecylbenzenesulfonate is markedly reduced by increasing concentrations of sodium sulfate in the spray slurry. This reduction is accomplished by a corresponding rise in penetrant effectiveness. Thus, the CMC of a surfactant in the actual spray slurry determines the effectiveness of that surfactant as a penetrant. Where only the surfactant and the compounds of this invention are desirable components of a spray slurry, preferred surfactants can be chosen from a knowledge of the CMC's of surfactants measured in water.

TABLE II

Effect of $Na_2SO_4$ on 2-Benzimidazolecarbamic Acid, Methyl Ester + Surfactant

| Surfactant (250 ppm in Spray Slurry) | % $Na_2SO_4$ in Spray Slurry | CMC of Surfactant (ppm) | % Disease Control at 80 ppm Active(Cucumber Powdery mildew |
|---|---|---|---|
| None | None | — | 8 |
| Na Dodecylbenzenesulfonate | None | 1500 | 22 |
| Na Dodecylbenzenesulfonate | 0.3 | 123 | 38 |
| Na Dodecylbenzenesulfonate | 0.6 | 100 | 45 |
| Na Dodecylbenzenesulfonate | 0.9 | 82 | 51 |
| Na Dodecylbenzenesulfonate | 1.5 | 56 | 70 |
| Na Dodecylbenzenesulfonate | 2.0 | 45 | 74 |

Surfactants that act as "penetrants" either alone or in combination in enhancing disease control by the compounds of this invention include sulfonated and sulfated amines and amides, diphenyl sulfonate derivatives, ethoxylated alcohols, ethoxylated alkylphenols, derivatives of fatty acids with ethylene oxide, ethoxylated fatty esters and oils, polyethylene oxide-polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated sulfonated oils and fatty acids, alkylbenzene- and alkyltoluene sulfonates, imidazolines, taurates, ethoxylated mercaptans, ethoxylated amines and amides, modified phthalic glycerol alkyd resins, and similar materials.

Other surface active agents acting as "penetrants" for the compounds of this invention that can be used include betaines, fatty esters, ethoxylated fatty esters, and oils, monoglyceride derivatives, sucrose esters, alkylhaphthalene sulfonates, condensed naphthalene sulfonates, lignin derivatives, protein derivatives, salicylanilides, sarcosines, petroleum sulfonates, and tertiary amine oxides.

Preferred types of surface-active agents to be used as penetrants for the compounds of this invention are polyhydric alcohol esters (particularly those of glycol and glycerol), ethoxylated alcohols, ethoxylated alkylphenols, derivatives of fatty acids with polyglycols or ethylene oxide, ethoxylated fatty esters and oils, polyethylene oxide-polypropylene oxide combinations, alcohol sulfates, ethoxylated alcohol sulfates, sulfated ethoxylated alkylphenols, modified phthalic glycerol alkyd resins ("Triton" B-1956) phosphate derivatives, sorbitan and sorbitol derivatives, betaines, tertiary amine oxides, blends of aromatic sulfonates and ethylene oxide derivatives, organic sulfates and sulfonates plus inorganic salts and blends of two or more of these types.

Most preferred types of surface-active agents acting as penetrants to improve the activity of the active compounds are polyhydric alcohol esters ("Trem" 014), ethoxylated long chain alcohols ("Brij" 76 and "Brij" 78), derivatives of fatty acids with polyglycols ("Hodag" 20L and 40L, "Nonisol" 210) sorbitan fatty acid monoester ethylene oxide condensates ("Tween" 20, 40, 60, 80 and 81), betaines (N-lauryl betaines), ethoxylated alcohol sulfates (sodium lauryl ether sulfate), polyethylene glycol 400 modified mixture of di- and triglycerides of ricinoleic acid ("Pegosperse" 400 DTR), sodium N-methyl-N-oleoyltaurate ("Igepon" T-77) ethoxylated alkylphenols ("Tergitol" 12-P-9), sodium dodecylbenzenesulfonate and sodium lauryl sulfate plus inorganic salts. Examples given in parentheses are illustrative and do not exclude other unnamed commercial products.

The preferred readily available species of surface active agents acting as penetrants to improve the activity of the active compounds are set out below. Where the items have an indefinite chemical name the CMC is also listed for the sake of clarity. The species are sodium lauryl sulfate (Duponol ME); N-laurylbetaine; polyoxyethylene(20)-sorbitan monostearate (Tween 60); polyoxyethylene(20)sorbitan monolaurate (Tween 20); lauryloxypolyethoxyethanol-23 E.O. (Brij 35); polyoxyethylene(30)stearate (Myrj 51); dodecylphenoxypolyethoxyethanol, CMC 15 ppm (Tergitol 12-P-9); fatty alkylol amide condensate, CMC 70 ppm (Alrosol 0 neutralized); modified alkanolamide, CMC 220 ppm (Witcamide 272); cetyloxypolyethoxyethanol (10EO) (Brij 56); potassium oleate; sodium lauryl ether sulfate-4 E.O. (Duponol RF); stearyloxypolyethoxyethanol-10 E.O. (Brij 76); stearyloxypolyethoxyethanol-20 E.O. (Brij 78); polyethylene glycol 200 monolaurate (Hodag 20L); polyethylene glycol 400 monolaurate (Hodag 40L); polyethylene glycol 600 monostearate (Hodag 60S); polyhydric alcohol ester, CMC 40 ppm (Trem 014); sodium N-methyl-N-oleyltaurate (Igepon T77); sodium dodecyl benzenesulfonate; and sodium N-coco-β-aminopropionate, CMC 44 ppm (Deriphat 151). Of the surface active agents listed above the most preferred are: potassium oleate; sodium lauryl ether sulfate-4E.O. (Duponol RF); stearyloxypolyethoxyethanol-10 E.O. (Brij 76); stearyloxypolyethoxyethanol-20 E.O. (Brij 78); polyethylene glycol 200 monolaurate (Hodag 20L); polyethylene glycol 400 monolaurate (Hodag 40L); polyethylene glycol 600 monostearate (Hodag 60S); polyhydric alcohol ester (Trem 014); sodium N-methyl-N-oleyltaurate (Igepon T77); and sodium N-coco-β-aminopropionate (Deriphat 151). Examples of other surface-active agents are listed in "Detergents and Emulsifiers", 1966 Annual, or 1967 Annual, published by John W. McCutcheon Inc., 236 Mt. Kemble Avenue, Morristown, New Jersey.

In general, the surface active agents which are preferred as surfactant penetrants with the 2-benzimidazolecarbamic acid alkylester fungicides are materials which have a critical micelle concentration in water at room temperature of approximately 750 parts per million or less.

The fungicidal compounds useful to exert disease control action, can be rendered into a physical form useful for application by admixture with a carrier material or conditioning agent of the kind used and commonly referred to in the art as an adjuvant or modifier. The general classes of adjuvants applicable to the compounds of this invention include inert solids, organic liquids or aqueous diluents. Compositions adapted for ready and efficient application using conventional applicator equipment are prepared by formulating compounds of this invention with suitable adjuvants by mixing, grinding, stirring or other conventional processes. Normally, the active ingredient comprises 1–98% by weight of fungicidal composition. The preferred types of formulations are wettable powders, and suspension concentrates.

The compositions containing the active ingredient and the surface-active agents can be made in several ways. For example, the penetrant can be mixed with the active ingredient (or with the active ingredient formulated in a conventional composition as described above) when spray slurries are being prepared. It is often also possible and convenient to produce formulations in which the additive and the active ingredient will both be present in a composition which is convenient to apply, for example, by dispersion in water followed by spraying. Such compositions can be powders, suspensions, or even solutions, depending upon the physical and chemical characteristics of the components that are to be prepared.

It is often convenient and beneficial to provide the surfactant as a separate composition, for example as a water soluble or dispersible liquid or solid or as a mixture with diluents such as clay or fine silica. This procedure provides for convenient addition of the surfactant to a spray slurry and enhances the biological activity of the application.

In the compositions of the invention, such as wettable powders, suspensions and slurries, it is preferred to have the active compounds present in the proper amount for optimum fungicidal activity and in a fine particle size. The desired fine particle size can be obtained, for example, by fine grinding. Preferred grinders to obtain such fine particles include ball and pebble mills, sand mills, air mills, pin or stud mills, "Attritors," whizzer mills, ring-roller mills, disk mills and the like. Regardless of the type of grinder used, the grinding process must be carried out under conditions to assure that the product which is made shall have an adequately fine particle size. Particle size classifiers can be used in conjunction with the grinders to help meet this requirement. The use of sucrose as a grinding aid also helps obtain the desired particle size.

These very finely divided forms of the active ingredient are surprisingly more active than formulations of conventional particle size. The finely divided form has improved penetration into the plants and, thus, enhance the curative effect. These fine particles also have improved solubility characteristics. Further, these forms are stable and have good residual activity, thus providing preventive control. With many fungicides, a reduction in particle size can lead to problems with phytotoxicity; this is not the case with the finely divided forms of this invention.

By very finely divided form it is meant that the particle size is predominantly less than 5 microns in diameter with at least 40% by weight of the active compound and preferably 60% by weight, in the form of particles below 2 microns in diameter. The particle size refers to the ultimate particle size as it exists in the spray droplet or dust which contacts the plant. In the dry compositions, or even in the spray slurry before spraying, the fine particles can exist as floccules or aggregates, or agglomerates, in which several fine particles are associated together.

The preferred method to determine the particle size of the compounds of this invention is by sedimentation analysis in an Andreasen pipette. In this method, the decrease of concentration is determined of particles at a particular level in suspension, as they settle according to Stokes' Law-under the influence of gravity. This is a well-known technique for particle size analysis, and numerous references can be cited to describe in general how particle size and particle size distributions can be determined by this method:

Orr and Dallavelle "Fine Particle Measurement" MacMillan Co., New York, 1959, Chapter 3

Irani and Callis, "Particle Size:Measurement, Interpretation, and Application" John Wiley and Sons, New York, 1963, Chapter 5.

Herdan "Small Particle Statistics," 2nd Edition, Academic Press, New York, 1960, Chapter 20

Lauer "Grain Size Measurements on Commercial Powders," Alpine AG, Augsburg, Germany, English Edition, 1966.

For the compounds of this invention, a sample of formulated commodity, or if the technical material is used, a sample of the technical active ingredient plus suitable wetting and dispersing agents, is dispersed to form a slurry of up to 1% concentration in sufficient volume to fill the Andreasen pipette. This is preferably done by gently pasting the material in about 10% of the final volume using distilled water and then stirring for about 15 minutes to disperse the product. The concentrate is then diluted with additional distilled water to the appropriate volume for the pipette. Before the start of the actual sedimentation analysis the pipette is shaken vigorously for about 1 minute and then inverted vigorously 10 to 20 times to obtain a homogeneous slurry.

Immediately before the start of the settling period a sample is taken to represent the initial, uniform slurry. Sedimentation is then carried out by allowing the pipette to stand undisturbed, free from vibrations, at constant temperature, so that the particles can settle in accordance with the terminal velocity governed by their size and the balance between gravity forces and drag forces in the sedimentation fluid. Samples are withdrawn from the Andreasen pipette at suitable time intervals corresponding to the particle sizes of interest. The amount of active ingredient in each sample represents material which has not yet settled below the sampling point, and which therefore has a particle size smaller than those particles which would have settled below the sampling point in the indicated time period.

From the analysis of the active ingredient content of the samples and the settling times, the sedimentation diameters, or a particle size distribution curve can be calculated by the use of Stokes's Law. In the calculation of Stokes diameters, some assumptions must be made regarding the particle shape, and the particle sizes referred to for the compounds of this invention are the equivalent spheres, e.g., the particle diameter is defined as the diameter of a spherical particle that would settle at the same rate as the particle concerned. These sizes are found by using the equation $$d = 175 \sqrt{\frac{n}{\rho 1 - \rho 2} \cdot \frac{h}{t}}$$

where
$d$ = diameter of particle in microns
$n$ = viscosity in g/cm/sec
$\rho_1$ = specific gravity of solid in g/cm$^3$
$\rho_2$ = specific gravity of liquid in g/cm$^3$
$h$ = settling distance in cm
$t$ = settling time in minutes.

One critical aspect of pipette sedimentation analysis is the requirement that the particles of the compounds of this invention are dispersed in the sedimentation fluid and not agglomerated or flocculated so that the particles can settle as individuals rather than as aggregates. If the degree of dispersion is poor, e.g., if particles settle as aggregates, inaccurate results are obtained, and the particle size distribution appears to be coarser than it really is. There are a number of methods to ascertain that a good dispersion, suitable for sedimentation analysis, is obtained. One such method is microscopic examination of drops of the dilute suspension in transmitted light at a suitable magnification. A poorly dispersed sample will show characteristic flocculation structures, whereas a well-dispersed one will show individual particles evenly spaced, with particles smaller than approximately 2 microns exhibiting Brownian movement. Since the agitation inherent in placing drops on a microscope slide and applying a cover glass may redisperse agglomerated material, examination of such slides should be made not only immediately upon preparation, but also a few minutes later to determine whether flocculation exists. Another method of checking for adequate dispersion is to take samples representing a given cut size at different sample heights in the pipette, e.g., after different settling times. This can be accomplished, for example, by using different volumes of settling fluid in the Andreasen pipette. Since flocculation is a phenomenon which often takes place slowly with time, a significant discrepancy between the results for a given cut size obtained in this manner would indicate inadequate dispersion, particularly if the percentage of active ingredient remaining in the sample is less in the sample which has been allowed to settle through the greater distance for the longer time period.

If the formulations of the 2-benzimidazolecarbamic acid esters contain clays and other water-insoluble ingredients, the samples taken during Andreasen sedimentation analysis are analyzed optically for the amount of active ingredient. A 1 ml. aliquot of the sample is shaken with about 70–80 mls. of 0.1 N NaOH, and diluted to 100 ml. A 10 ml. portion of this suspension is clarified by suitable filtration (such as in a Swinny filter attached to a syringe) and the UV absorbance of the clarified solution or an aliquot of the same is determined on a spectrophotometer at 292 $\mu$. The amount of 2-benzimidazolecarbamic acid ester is then obtained by comparison to a calibration curve obtained in a similar manner from known amounts of active ingredient. Where the other, water-soluble ingredients, such as the surface active agents, also have UV absorbance at the 292 $\mu$ wavelength, suitable corrections must be made.

When the material which is evaluated by pipette sedimentation consists of technical compound of the invention, possibly in the presence of wetting and dispersing agents to get adequate dispersion in the sedimentation fluid, or where the formulation ingredients other than the compound of the invention are soluble in the sedimentation fluid, the amount of active ingredient in the different pipette samples taken after different time periods can be determined by simple gravimetric analysis of the total solids present, making due allowances for the constant amount of dissolved solids in all samples.

Another method sometimes useful for particle size analysis for compounds of this invention is microscopic counting. This method, however, is applicable only in cases where the active ingredients are the only solids visible in the microscope. In most formulations the inerts and the other additives will also show up as particles in the microscope, and it is usually difficult to differentiate between particles of fungicidal compound versus the additives. Where, however, a particle size of the pure active compound is to be determined, or where the formulation additives can be dissolved away or are soluble in the medium which is placed on the microscope slide with the active ingredient, or where the formulation is a suspension concentrate in which the active compound is the sole or predominant solid phase, microscope methods can often be used. There are numerous general references to microscopic analysis such as:

Orr and Dallavalle "Fine Particle Measurement" MacMillan Co., New York 1959, Chapter 2

Irani and Callis "Particle Size:Measurement, Interpretation, and Application" John Wiley and Sons, New York, 1963, Chapter 6.

Herdan "Small Particle Statistics," 2nd Edition, Academic Press, New York, 1960, Chapter 18

Lauer "Grain Size Measurements on Commercial Powders," Alpine AG, Augsburg Germany, English edition, 1966, Chapter 4.

A method to determine the particle size of the compounds of this invention is to take photomicrographs, for example at 800X magnification, and then compare the individual particles on the pictures against a thin transparent template which has round holes corresponding to 1, 2, 3, etc. microns at that magnification, Particle images matching in area a given hold size can be counted, and duplicate counts can be avoided by piercing the photomicrograph with a needle whenever a particle has been counted. By counting at least approximately 7000– 1000 particles in this manner, a particle size distribution can be calculated.

When particle size distributions are calculated from microscopic counts, an assumption must be made concerning the third dimension (height of thickness) which of course does not appear in the microscope. Comparisons of Andreasen pipette sedimentation results as described above with microscopic counts have shown that good results are obtained from microscopic particle size analysis when it is assumed that all of the particles have the same thickness, e.g., that the larger particles are platelets. With this assumption, the weight fractions are calculated from the square of the particle diameters measured by inspection with the plastic template. However, where it is known that the large particles are approximately cubical or spherical it will be more accurate to calculate the particle size distribution from the cubes of the particle diameters.

In microscopic particle size analysis great care must be taken that the sample which is to be examined on the microscope slide is representative of the product whose particle size is to be determined, and that the photomicrographs from which the actual counts are made are representative of the slides being evaluated. As will be appreciated by those skilled in the art, it is usually necessary to prepare several microscope slides, in each case taking separate samples from the product or the slurry of the product, and then for each slide to inspect a number of fields in order to obtain a representative view to count.

The active compound of the formula can also be applied in the form of an acid salt composition as described in assignee's copending application Ser. No. 104,485, filed Jan. 6, 1971. The acid salt compositions also can have their activity improved by the addition of the above-described "surfactants".

Compositions of the compounds of the formula can contain, in addition, conventional insecticides, miticides, bactericides, nematocides, additional fungicides or other agricultural chemicals such as fruit set agents, fruit thinning compounds, fertilizer ingredients and the like, so that the compositions can serve additional useful purposes.

The following are illustrative of the agricultural chemicals that may be included in compositions of the compounds of this invention or, additionally, that may be added to sprays containing one or both of the active compounds of this invention. The additional agricultural chemicals are employed in mixtures or combinations in amounts ranging from one-fifth to twenty times that of the compound or compounds of this invention. The proper choice of amounts is readily made by one skilled in the art of protecting plants from pest depredations.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a-4,7,7a-tetrahydroindane;
1,1,1-trichloro-2,2-bis(p-chlorophenyl)ethane (DDT);
1,2,3,4,10,10-hexachloro-6,7-epoxy-1,4,4a,5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin); 1(or 3a),4,5,6,7,8,8-heptachloro-3a,4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate ("Sevin" carbaryl);
methylcarbamic acid, ester with phenol, 4-(dimethylamino)-3,5-dimethyl;
methylcarbamic acid, ester with 1,3-dithiolan-2-one oxime;
O,O diethyl-O-[2-isopropyl-4-methylpyrimid-6-yl]thiophosphate;
O,O dimethyl-1-hydroxy-2,2,2-trichloroethyl phosphonate (diazinon);
O,O-dimethyl S-(1,2-dicarbethoxyethyl)dithiophosphate (malathion);
O,O-dimethyl O-p-nitrophenyl thiophosphate (methyl parathion);
O,O-diethyl O-p-nitrophenyl thiophosphate (parathion);
O,O-dimethyl O-(3-chloro-4-nitrophenyl) thiophosphate;
dl-2-cyclopentenyl-4-hydroxy-3-methyl-2-cyclopenten-1-one chrysanthemumate;
O,O-dimethyl O-(2,2-dichlorovinyl) phosphate (DDVP dichlorvos); mixture containing 53.3% "Bulan", 26.7% "Prolan" and
20.0% related compounds;
O,O,-dimethyl O-(2,4,5-trichlorophenyl) phosphorothioate;
O,O-dimethyl S-(4-oxo-1,2,3-benzotriazine-3(4H)-yl-methyl) phosphorodithioate ("Guthion" azinphosmethyl);
bis-(dimethylamino)phosphonous anhydride;
O,O-diethyl-O-(2-keto-4-methyl-7-a'-pyranyl) thiophosphate;
O,O-diethyl (S-ethylmercaptomethyl) dithiophosphate;
calcium arsenate;
sodium aluminofluoride;
dibasic lead arsenate;
2'-chloroethyl 1-methyl-2-(p-tert-butylphenoxy)ethyl sulfite; azobenzene;
ethyl 2-hydroxy-2,2-bis(4-chlorophenyl)acetate;
O,O-diethyl O-[2-(ethylmercapto)ethyl] thiophosphate
(Systox demeton);
2,4-dinitro-6-sec-butylphenol;
toxaphene;
O-ethyl O-p-nitrophenyl benzenethiophosphonate (EPN);
4-chlorophenyl 4-chlorobenzenesulfonate;
p-chlorophenyl phenyl sulfone;
tetraethyl pyrophosphate (TEPP);
1,1-bis-(p-chlorophenyl)ethanol;

1,1-bis-(p-chlorophenyl)2,2,2-trichloroethanol (Kelthane dicofol);
p-chlorophenyl p-chlorobenzyl sulfide;
bis-(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
2-(o-hydroxyphenyl)-1,3-dithiolane methylcarbamate ester;
2-(o-hydroxyphenyl)-1,3-dioxolane methylcarbamate ester;
dl-2-allyl-4-hydroxy-3-methyl-2-cyclopenten-1-one esterified with a mixture of cis and trans dl-chrysanthemum monocarboxylic acids;
butoxypolypropylene glycol;
ethyl 2-hydroxy-2,2-bis(4-chlorophenyl)acetate (chlorobenzilate);
p-dichlorobenzene;
2-butoxy-2'-thiocyanodiethyl ether;
naphthalene;
methyl O-carbamylthiolacetohydroxamate;
1,1-dichloro-2,2-bis(p-ethylphenyl)ethane;
methyl O-(methylcarbamyl)thiolacetohydroxamate (methomyl);
p-dimethylaminobenzenediazo sodium sulfonate;
2-heptadecylimidazoline acetate (glyodin);
quinone oxyaminobenzooxohydrazone; tetralkylthiuram disulfides such as tetramethylthiuram
disulfide or tetraethyl thiuram disulfide; sulfur;
metal salts of ethylenebisdithiocarbamic acid or propylenebisdithiocarbamic acids, e.g.
manganese, zinc, iron and sodium salts (maneb or zineb);
pentachloronitrobenzene;
2-(1-methylheptyl)-4,6-dinitrophenyl crotonate and other nitrophenol derivatives;
n-dodecylguanidine acetate (dodine);
N-(trichloromethylthio)phthalimide;
N-trichloromethylthiotetrahydrophthalimide (captan);
cis-N-[(1,1,2,2-tetrachloroethyl)thio]-4-cyclohexene-1,2-dicarboximide;
2,4-dichloro-6-(o-chloroaniline)-s-triazine ("Dyrene");
bis(4-chlorophenyl)-3-pyridylmethanol;
N-methylmercury p-toluenesulfonanilide;
chlorophenolmercury hydroxides;
nitrophenolmercury hydroxides;
ethylmercury acetate;
ethylmercury 2,3-dihydroxypropylmercaptide;
methylmercury acetate;
methylmercury 2,3-dihydroxypropylmercaptide;
3,3'-ethylenebis(tetrahydro-4,6-dimethyl-2H-1,3,5-thiadiazine-2-thione);
methylmercury dicyandiamide;
N-ethylmercury-p-toluenesulfonanilide;
Triphenyltin hydroxide; 1,4-dichloro-2,5-dimethoxybenzene
Triphenyltin acetate; metal (e.g. iron, sodium and zinc), ammonium and amine
salts of dialkyldithiocarbamic acids;
2,6-dichloro-4-nitroanaline;
tetrachloronitronanisole;
hexachlorobenzene;
hexachlorophene;
methylmercury nitrile;
tetrachloroquinone;
2,3-dichloro-1,4-napthoquinone;
N-trichloromethylthiophthalimide;
cupric hydroxide;
tribasic copper sulfate;
fixed copper;
1,2-dibromo-2-chloropropene;
1,2-dibromo-3-chloropropane;
dichloropropane - dichloropropene mixture;
ethylene dibromide; chloropicrin; and
sodium dimethyldithiocarbamate;
tetrachloroisophthalonitrile;
1-benzimidazolecarboxylic acid, 2-carboxyamino, dimethyl ester;
2,3-dihydro-5-carboxanilide-6-methyl-1,4-oxathiin-4,4-dioxide;
streptomycin or other antibiotics;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the compounds which can be mixed with the active compounds of this invention are not intended to any way limit the invention.

The use of pesticides such as those listed above in combination with a compound within the scope of this invention sometimes appears to greatly enhance the activity of the active compound of the invention. In other words, an unexpected degree of activity is sometimes seen when another pesticide is used along with the methods of this invention.

In order that the invention may be better understood, the following examples are offered:

EXAMPLE 1

The compound 2-benzimidazolecarbamic acid, methyl ester is prepared by the following method.

A mixture of 228 parts of thiourea and 110 parts of water is treated over a five minute period with 244 parts of dimethyl sulfate. Rapid agitation is used throughout the whole procedure. The temperature of the reaction mixture rises to 95°C., then begins to subside. The material is brought to reflux by application of heat and held at reflux for 30 minutes, then cooled to −3°C., diluted with 1800 parts of water, and treated with 535 parts of methyl chloroformate in one portion. A 25% solution of aqueous sodium hydroxide is added at such a rate as to keep the pH of the reaction mixture between 6 and 7 and the temperature below 25°C. When the pH of the mixture reaches 6.9 and the rate of change of pH has become negligible, the addition of base is stopped. The amount of base required is 1085 parts by volume of 25% solution. The temperature at the end of this addition is 23°C. Immediately after the completion of the base addition, 360 parts of glacial acetic acid is added over a 20 minute period, followed by 324 parts of o-phenylenediamine in one portion. The resulting mixture is slowly warmed to 80°C. and held there for 30 minutes, then cooled to 27°C. and the light tan solid product isolated by filtration, washed well with water and acetone, and air-dried.

A wettable powder is then made in the following manner:

| | |
|---|---|
| 2-benzimidazolecarbamic acid, methyl ester | 15% |

| | |
|---|---|
| Synthetic fine silica | 25% |
| Sodium lauryl sulfate | 60% |

The benzimidazole is blended with the silica and the mixture is air-milled. This mixture is then blended with the sodium lauryl sulfate and is then hammer-milled to obtain a homogeneous product. Particle size analysis by Andreasen pipette sedimentation shows that more than 40% by weight of the active ingredient is in the form of particles smaller than 2 microns in diameter.

The above composition is added to water in an amount to provide 250 ppm of the active compound of this invention. The surfactant concentration is 1000 ppm and thus above the critical micelle concentration. Such a preparation is sprayed on alternate trees in a Michigan cherry orchard at the rate of 10 liters per tree. A normal treating schedule for cherries is used starting early in the season. At the end of the summer and more than six weeks after the last application, the treated trees are healthy and retain all foliage. The adjoining untreated trees, on the other hand, are heavily defoliated by the cherry leaf spot disease.

2-Benzimidazolecarbamic acid, ethyl ester is similarly formulated and applied to give like results.

EXAMPLE 2

| | |
|---|---|
| 2-Benzimidazolecarbamic acid, methyl ester | 30.0% |
| Calcium, magnesium ligninsulfonate | 15.0 |
| Hydrated attapulgite | 1.4 |
| Anhydrous sodium carbonate | 2.1 |
| Water | 51.5 |

The above components are sandground together until substantially all particles are below 3 microns, as seen in a microscope, and more than half of the active ingredient is in the form of particles having a diameter less than 2 microns.

A field planting of rice in Louisiana is heavily inoculated with the rice blast fungus. Three days later, after the fungus has had adequate time to penetrate and become established in the rice plants, selected plots are sprayed with water containing 300 ppm of a modified phthalic glycerol alkyd resin surfactant ("Triton B" 1956) and the composition described above in an amount to provide 300 ppm of the active compound of this invention. The spray is applied at the rate of 300 liters per hectare. Four weeks later, the rice plants in the treated plots remain healthy. The untreated rice surrounding the plots, on the other hand, is heavily diseased with blast.

As the rice is inoculated well in advance of treatment, the curative effect of the composition and method is demonstrated.

Still other plots in the same planting are sprayed with water containing 600 ppm "Triton B" 1956 and the composition described above at a concentration containing 12,000 ppm of the active compound of this invention. The rice treated at this very high level (40 times that providing protection) exhibits no evidence of chemical injury, thus, illustrating the high degree of crop safety shown by the compounds of this invention.

EXAMPLE 3

The composition of Example 2 is added to water containing 300 ppm of a modified phthalic glycerol alkyd resin surface-active agent ("Triton" B 1956) in an amount to provide 300 ppm of the active compound of this invention. The resulting suspension is sprayed at the rate of 15 liters per tree on alternate trees in a peach orchard. Spraying is started as the buds open in the spring and repeated at intervals of 7 to 14 days until harvest time. The remaining trees in the planting are left untreated.

At the time of harvest the treated trees are healthy and the fruit is sound. The untreated trees, on the other hand, have fruit that is heavily diseased with peach scab and brown rot.

EXAMPLE 4

| | |
|---|---|
| 2-benzimidazolecarbamic acid, methyl ester | 70.0% |
| sodium alkylnaphthalenesulfonate | 3.0 |
| oleyl ester of sodium isethionate | 2.0 |
| diatomaceous silica | 25.0 |

The above components are mixed, hammer-milled and then air milled. Evaluation of the size distribution of the active ingredient by sedimentation analysis shows that at least 60% by weight of the active is present as particles having a diameter of 2 microns annd less.

The above composition is added to water containing 300 ppm of a polyhydric alcohol ester surfactant ("Trem" 014). The amount of the composition used is such as to provide 300 ppm of the active compound of this invention in the final aqueous preparation. This preparation is then sprayed on alternate trees in an apple orchard known to have become infected with the apple scab organism three days earlier. There is also evidence of incipient powdery mildew growth on some of the trees at the time of treatment. The spray is applied to the medium sized standard apple trees at the rate of 40 liters per tree. Three weeks after treatment, the trees are inspected. The treated trees are completely free of scab and there is no more powdery mildew present than at the time of treatment. The untreated trees, on the other hand, are heavily diseased with scab and have a great deal more powdery mildew than was present at the start of the test. Thus, the composition described above applied in the manner explained kills both the apple scab and powdery mildew fungus present at the time of treatment and, therefore, prevents fungus disease damage.

Other trees in the same orchard are treated with a spray as above except that a sufficient amount of the composition is used to provide 21,000 ppm of the active component or 70 times the amount known to provide curative disease control. These trees remain free of any evidence of chemical injury illustrating an amazingly broad margin of safety.

EXAMPLE 5

A sample of technical 2-benzimidazolecarbamic acid, methyl ester is hammer-milled in a MikroPulverizer through a screen having openings of 0.027 inches in diameter. A portion of this material is then carefully air milled at a steady feed rate. The hammer milled and the air milled portions are each blended with formulation ingredients as follows:

| | |
|---|---|
| 2-benzimidazolecarbamic acid, methyl ester | 52.6% |
| sucrose | 43.65% |
| "Aerosol" OT-B (sodiumdioctylsulfosuccinate) | 3.0% |
| "Methocel" 15 (methylcellulose) | 0.75% |

The particle size distribution of each of the two products is determined as follows:

Six grams of product is gently pasted into a small quantity of distilled water and then diluted with 35 to 40 ml. of distilled water; the resulting slurry is stirred for 15 minutes. This concentrate is then diluted to 1% total slurry concentration with distilled water and the resulting slurry is mixed by inverting the containers 10 to 20 times. The diluted slurry is poured into each of two Andreasen pipettes. Pipette A is shaken vigorously for one minute, and duplicate 10 ml. control samples are withdrawn and collected in tared aluminum weighing dishes. After adjusting the slurry height to exactly 5 cm. above the sampling point, it is shaken again for one minute and sedimentation is then allowed to proceed. Pipette B is handled in the same way except that the height of the slurry is adjusted to 10 cm.

Duplicate 10 ml. samples are withdrawn from the pipettes at times calculated from the slurry settling heights and the desired particle size discrimination by the following equation:

$$d = 175 \sqrt{\frac{n}{\rho^1 - \rho^2} \cdot \frac{h}{t}}$$

d = diameter of equivalent spheres, microns
n = viscosity of settling medium, poise
$\rho_1$ = density of particles, g/cm$^3$ (1.50 for technical 2-benzimidazolecarbamic acid, methyl ester)
$\rho_2$ = density of settling fluid, g/cm$^3$
h = settling height, cm.
t = settling time, min.

The samples are allowed to evaporate to dryness at room temperature and are then dried to constant weight at 70°C.

Dried sample weights are corrected for the constant weight of water-soluble components, averaged, and this average is divided by the corrected average for the control samples. The weight fraction of the total insoluble material which still remains in suspension at above the sampling point is thus calculated for the various particle sizes.

The results of this particle size analysis are shown in the following table:

| Sample | Weight Fraction Under | | | | |
|---|---|---|---|---|---|
| | 1μ | 1.8μ | 2.5μ | 5μ | 10μ |
| Hammer milled | 0.08 | 0.13 | 0.23 | 0.56 | 0.84 |
| Air Milled | 0.32 | 0.70 | 0.94 | 0.99 | 0.98 |

From a plot of these data, sedimentation analysis shows that approximately 78% by weight of the active ingredient in the air milled sample is present in the form of particles having a diameter less than 2 microns, while the hammer milled sample contains only approximately 15% of less than 2 micron material.

As part of the sedimentation analysis, samples of some of the fractions are examined microscopically to ensure (a) that the calculated particle diameters are approximately correct, (b) that the sample is clean, e.g., free from larger particles, and (c) that gross amounts of agglomerates are absent. Slurry agglomeration is tested in another way in such an experiment: samples corresponding to a cut size of 1.8 μ are taken from both pipettes A and B; since the settling heights are quite different, settling times also differ for the two samples. The extent of agglomeration usually increases as the age of a slurry increases. Hence, if agglomeration were occuring to any extent in these slurries, the later 1.8 μ samples would be expected to contain less solid. In the several such experiments, values for the two 1.8 μ samples are in excellent agreement (average deviation 6%), indicating no interference from flocculation or agglomeration.

The particle size of 2-benzimidazolecarbamic acid, methyl ester after hammer-milling and air-milling as described above is also evaluated by microscopic counting.

Slides are prepared by mixing the unformulated material with Celvacene light vacuum grease and covering the mixture with 25 mm. cover glasses. The slides are examined at several magnifications with a Nikon SUR-KE microscope with Polaroid camera attachment. Several photomicrographs are made of representative areas of each slide at these different magnifications.

These photomicrographs are used to count the individual particles. A clear, thin plastic template is prepared with round holes corresponding to 1, 2, 3, etc. microns at 800X magnification. Particle images which match in area a given hole size are counted and marked by piercing the photomicrograph with a small needle; particles are thus counted only once. This procedure is continued until all particles with a sufficiently clear image are counted.

In order to estimate the third dimension of these particles, samples are prepared for electron microscopy by making chromium shadowcasts at an angle of 22°. The particles and their shadows are examined in an electron microscope and electron micrographs are made. These pictures indicate that nearly all of the particles are plates. It is assumed that all platelets have the same thickness, the size distribution is calculated for each sample by multiplying the number of particles of a given size by the square of the particle diameter, as it is seen in the microscope. Since this product is proportional to the weight of platelet particles having a uniform thickness, the fraction of each size is readily calculated by dividing each product by the sum of all such products for the sample.

The results of this microscopic count are shown in the following table:

| Sample | 1μ | 2μ | 3μ | 5μ | 10μ |
|---|---|---|---|---|---|
| Hammer milled | 0.03 | 0.13 | 0.23 | 0.43 | 0.84 |
| Air milled | 0.20 | 0.72 | 0.92 | 0.99 | 1.0 |

For the air milled product, 72% by weight of the active ingredient consists of particles having a diameter less than 2 microns, while only 13% of the hammer-milled product has a similar small particle size.

EXAMPLE 6

The hammer-milled product described in Example 5 is field tested in Florida with and without the addition of a surfactant at a concentration above its CMC.

A planting of cucumbers, divided into plots 10 meters long, is used for this experiment. Plants are already infected with powdery mildew before spray treatments are applied, thus an established infection must be eradicated and uninfected foliage protected if the chemical is to be effective. The hammer-milled product is added to water at a rate of 50 ppm of the active compound of this invention in the final aqueous preparation. A second preparation is made up of the hammer-milled product at a rate of 50 ppm active compound in water containing 300 ppm of a polyhydric alcohol ester-surfactant ("Trem" 014). These two preparations are then compared for disease control effectiveness after spraying at the rate of 800 liters per hectare on 7 day intervals to the end of the 10 weeks season. The plants in the plots treated with the hammer-milled product in water have been infected by powdery mildew and have a white dusty appearance and the crop yield is reduced. The plants in the plots treated with the hammer-milled product in water containing the "penetrant" Trem 014 are, on the other hand, healthy and a normal green color with a normal yield of cucumbers.

The untreated plots and untreated border or buffer rows are severely diseased by powdery mildew. The leaves are dried up exposing the reduced crop of cucumbers to sun scald.

EXAMPLE 7

| | |
|---|---|
| 2-benzimidazolecarbamic acid, methyl ester | 51.6% |
| sucrose | 44.9% |
| sodium dicotylsulfosuccinate | 3.0% |
| methyl cellulose | 0.5% |

The above ingredients are hammer-milled in a Mikro-Pulverizer to a particle size essentially below 100 microns. The composition is slurried in water containing 250 ppm of stearyloxypolyethoxyethanol-20 E.O.* ("Brij" 78) to an active concentration level of 80 ppm. The following surfactant can replace stearyloxypolyethoxyethanol-20 E.O. in equal amounts:
lauryloxypolyethoxyethanol-23 E.O. ("Brij" 35)*
polyethylene glycol 200 monolaurate ("Hodag" 20-L)
sodium lauryl ether sulfate-4 E.O. ("Duponol" RF)
N-lauryl betaine
cetyloxypolyethoxyethanol-10 E.O.
nonylphenoxypolyethoxyethanol-10 E.O. ("Igepal" CO-710)
polyoxyethylene(20)sorbitan monooleate ("Tween" 80)
polyoxyethylene(20)sorbitan monostearate ("Tween" 60)
polyethylene glycol 400 monolaurate ("Hodag" 40-L)
polyhydric alcohol ester ("Trem" 014)
polyethylene oxide-polypropylene oxide condensate ("Pluronic" P-75)
*E.O. = ethylene oxide The 2-benzimidazolecarbamic acid, methyl ester above can be replaced by the ethyl ester with similar results.

The above compositions are sprayed on young potted cucumber seedlings in an amount to fully wet the foliage, which are then allowed to dry and inoculated with powdery mildew by dusting them with conidia from previously diseased plants. After ten days of incubation in the greenhouse, the treated plants (6 for each composition) support very few powdery mildew colonies. On the other hand, untreated plants and plants sprayed with only the surfactants at 250 ppm in water are covered with powdery mildew. Plants treated with a spray containing the wettable composition but without the added surfactant are also heavily mildewed.

EXAMPLE 8

The composition of Example 7 is added to water in such quantity to make an 80 ppm active slurry. To the slurry is added sodium dodecylbenzene sulfonate and sodium sulfate in sufficient quantity to obtain 250 ppm of surfactant and 2.0% of inorganic salt. This slurry is sprayed on cucumbers for the control of powdery mildew in a preventive type test as described in Example 7. At least 70% of the leaf surface is free of mildew because of the above treatment. Untreated plants are completely covered with mildew.

In the above formulation, lauryloxypolyethoxyethanol-7 E.O or octylphenoxypolyethoxyethanol-9 E.O. can replace sodium dodecylbenzenesulfonate.

EXAMPLE 9

| | |
|---|---|
| 2-benzimidazolecarbamic acid, methyl ester | 25.0% |
| polyoxyethylene(20)sorbitan monooleate ("Tween" 80) | 25.0% |
| water | 48.5% |
| hydrated attapulgite | 1.5 % |

The above ingredients are combined and sand-ground to a particle size below 2 microns to form a liquid composition in which the particles are easily resuspended after long standing and are readily dispersed when added to water.

The above composition is diluted in water to a concentration of 300 ppm active ingredient and sprayed on a single row of bush beans at the time of 50% bloom in an amount sufficient to thoroughly wet the foliage. At the time of harvest the bean plants in the treated row are healthy, green and support a normal crop of bean pods. The remainder of the field, on the other hand is partly defoliated and supports only a few healthy bean pods. The white mold disease (Sclerotinia) has destroyed most of the unsprayed crop.

2-Benzimidazolecarbamic acid, ethyl ester can be similarly formulated and applied to give like results.

EXAMPLE 10

| | |
|---|---|
| 2-benzimidazolecarbamic acid, methyl ester | 26.3% |
| Stearyloxypolyethoxyethanol-20 E.O. | 22.0% |
| Water | 38.5% |
| Isopropanol | 13.2% |

The above ingredients are mixed and sand-ground to a particle size essentially below 2 microns. The suspension so obtained can be dispersed into water.

Selected apple trees in an orchard are sprayed to the point of run-off with the above composition at a concentration of 300 ppm of the active ingredient in water. The first treatment is made when the trees are in the tight cluster stage of development. This is after two extended rainfall periods which result in primary apple scab infection. Additional treatments are made throughout the growing season on an interval of every 18 days.

At the time of harvest, the treated trees are green and healthy with a full crop of disease-free fruit. The untreated trees, on the other hand, are partly defoliated and the fruit is unmarketable because of apple scab.

2-Benzimidazolecarbamic acid, ethyl ester can be similarly formulated and applied to give like results.

EXAMPLE 11

The composition of Example 7 is added to water to make a 16 ppm active slurry which is divided into six portions. Stearlyoxypolyethoxyethanol-20 E.O. ("Brij" 78) is added to five of these slurries at concentrations representing the CMC concentration and multiples of it. The six slurries are sprayed on cucumber plants for the control of cucumber powdery mildew in a preventive test of the type described in Example 7. The results are as follows:

| ppm of Active | ppm of Surfactant | Concentration of Surfactant on CMC Basis | % Disease Control |
|---|---|---|---|
| 16 | none | none | 10 |
| 16 | 23 | CMC | 16 |
| 16 | 46 | 2 × CMC | 30 |
| 16 | 92 | 4 × CMC | 46 |
| 16 | 184 | 8 × CMC | 51 |
| 16 | 368 | 16 × CMC | 48 |

I claim:

1. A method for the curative and preventive control of fungus diseases of living plants or plant parts with a wide margin of safety to the plants comprising applying to the plants or plant parts a fungicidal amount of a compound of the formula:

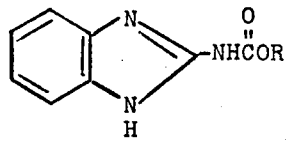

where R is methyl or ethyl in a spray slurry or suspension containing a surfactant at or above its critical micelle concentration in said slurry or suspension, the surfactant being selected from the group consisting of polyhydric alcohol ester (CMC 40 ppm), sodium lauryl sulfate, stearyloxypolyethoxyethanol-20 E.O., polyethylene glycol 600 monostearate, potassium oleate, lauryloxypolyethoxyethanol-23 E.O., sodium N-methyl-N-oleyltaurate, N-lauryl betaine, polyoxyethylene (20) sorbitan monostearate, polyoxyethylene (20) sorbitan monolaurate, polyoxyethylene (30) stearate, dodecylphenoxypolyethoxy ethanol (CMC 15 ppm), fatty alkylol amide condensate (CMC 70 ppm), modified alkanolamide (CMC 220 ppm), cetyloxypolyethoxy ethanol 10 E.O., sodium lauryl ether sulfate 4 E.O., stearyloxypolyethoxy ethanol 10 E.O., polyethylene glycol 200 monolaurate, polyethylene glycol 400 monolaurate, sodium N-coco-β-aminopropionate (CMC 44 ppm), and sodium dodecyl benzene sulfonate.

2. The method of claim 1 wherein the compound applied is 2-benzimidazolecarbamic acid, methyl ester.

3. The method of claim 1 wherein the compound applied is in the form of particles having a diameter below 5 microns.

4. The method of claim 3 wherein the compound applied is 2-benzimidazolecarbamic acid, methyl ester.

5. A fungicidal composition for the curative and preventive treatment of fungus diseases of living plants or plant parts with a wide margin of safety to the plants comprising a fungicidal amount of a compound represented by the following formula:

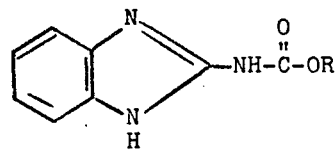

where P is methyl or ethyl with an amount of a surfactant such that the surfactant will be present in the final spray slurry in a concentration at or above its critical micelle concentration the surfactant being selected from the group consisting of polyhydric alcohol ester (CMC 40 ppm), sodium lauryl sulfate, stearyloxypolyethoxyethanol-20 E.O., polyethylene glycol 600 monostearate, potassium oleate, lauryloxypolyethoxyethanol-23 E.O., sodium N-methyl-N-oleyltaurate, N-lauryl betaine, polyoxyethylene (20) sorbitan monostearate, polyoxyethylene (20) sorbitan monolaurate, polyoxyethylene (30) stearate, dodecylphenoxypolyethoxy ethanol (CMC 15 ppm), fatty alkylol amide condensate (CMC 70 ppm), modified alkanolamide (CMC 220 ppm), cetyloxypolyethoxy ethanol 10 E.O., sodium lauryl ether sulfate 4 E.O., stearyloxypolyethoxy ethanol 10 E.O., polyethylene glycol 200 monolaurate, polyethylene glycol 400 monolaurate, sodium N-coco-β-aminopropionate (CMC 44 ppm), and sodium dodecyl benzene sulfonate.

6. The composition of claim 5 wherein at least 40% by weight of the particles of the compound of the formula are below 2 microns in diameter.

7. The composition of claim 5 wherein the compound applied is 2-benzimidazolecarbamic acid, methyl ester.

8. The composition of claim 6 wherein the compound applied is 2-benzimidazolecarbamic acid, methyl ester.

9. The composition of claim 5 wherein the surface active agent is selected from the group consisting of potassium oleate; sodium lauryl ether sulfate-4 E.O.; stearyloxypolyethoxyethanol-10 E.O.; stearyloxypolyethoxyethanol-20 E.O.; polyethylene glycol 200 monolaurate; polyethylene glycol 400 monolaurate; polyethylene glycol 600 monostearate; polyhydric alcohol ester (CMC 40 ppm); sodium N-methyl-N-oleyltaurate; and sodium N-coco-β-aminopropionate (CMC 44 ppm).

* * * * *